June 15, 1943.  W. H. STOUT  2,321,778
PIPE COUPLING MEANS
Filed Nov. 12, 1941
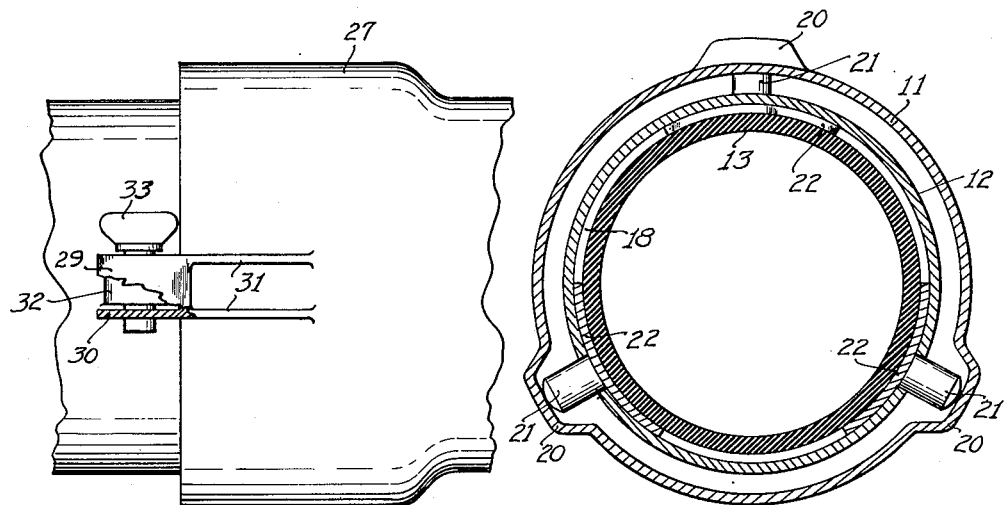
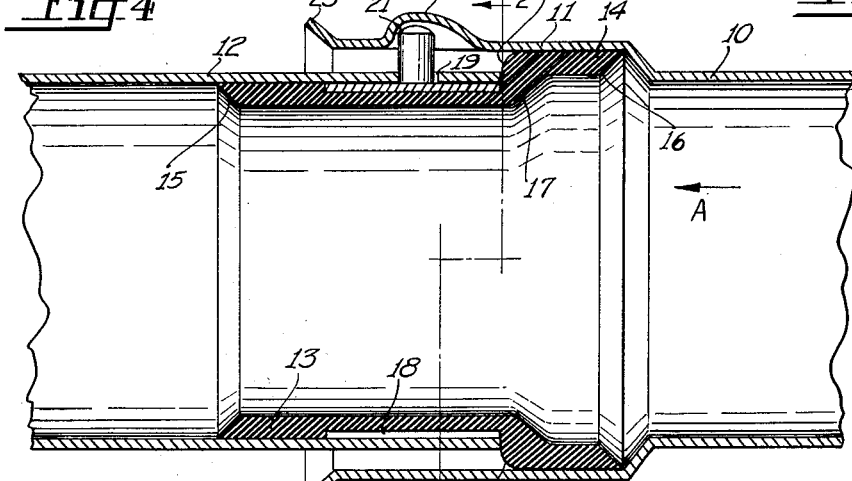
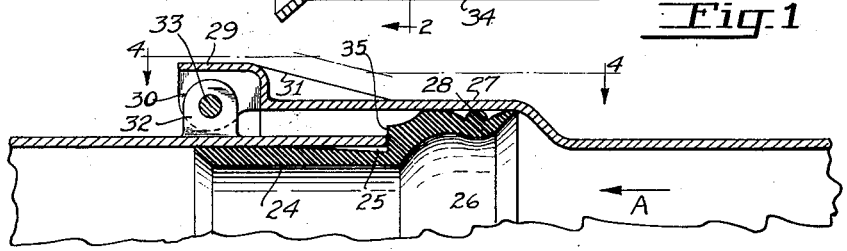
WILLIAM H. STOUT
INVENTOR.
BY T. J. Geisler
and F. R. Geisler.
ATTORNEYS Patented June 15, 1943

2,321,778

UNITED STATES PATENT OFFICE 2,321,778

PIPE COUPLING MEANS

William H. Stout, Eugene, Oreg.

Application November 12, 1941, Serial No. 418,709

2 Claims. (Cl. 285—90)

This application is a continuation in part taken from my copending application Ser. No. 373,152, filed under date of January 4, 1941, now United States Patent No. 2,270,089, entitled "Quick coupling for pipes"; and this invention, like that claimed in the said copending application, relates to coupling means for water pipes, and particularly to quick coupling means suitable for pipes used in irrigation systems.

More specifically, this invention relates to coupling means employing an expansible inner gasket or sealing member which will constitute a pressure seal between the connected pipe sections under the pressure exerted by the fluid within the pipe line.

An object of this invention is to provide an improved expansible sealing member or gasket of the type above indicated in which any tendency for such member to become dislodged or to permit water under pressure to force its way between the adjacent surfaces of said member and the pipe, or otherwise to seep through the juncture formed by such sealing member, will be eliminated.

Another object of this invention is to provide a flexible sealing member for bell and spigot ends of connected pipe sections which will maintain a leak-proof seal even though the connected pipe sections should be moved into axial angularity with respect to each other.

A more specific object is to provide a seal which will expand against the inner peripheries of both a spigot end and an enlarged bell end of adjoining or connected pipe sections, and which will have its forward end located outside of the circumference of the direct flow line of the liquid within the pipes in order to offer less obstruction at that end to such liquid flow.

These and incidental objects I attain by providing a quick coupling means for bell and spigot ends of pipe sections, and including therein an improved sealing member or gasket formed and arranged in the manner hereinafter described with reference to the accompanying drawing, in which;

Figure 1 is a longitudinal section of a bell and spigot joint showing one form in which my invention may be constructed;

Figure 2 is a transverse section corresponding to the line 2—2 of Figure 1;

Figure 3 is a fragmentary longitudinal section of a coupling between spigot and bell ends showing other means for securing the pipe ends together and illustrating a modified form of my expansible sealing gasket; and Figure 4 is a plan view of the coupling of Figure 3 corresponding to line 4—4 of Figure 3.

Referring first to Figures 1 and 2, the spigot end of one pipe section is indicated by the reference character 12, while the enlarged bell end of the other pipe section 10 is indicated by the reference character 11. The internal diameter of the bell end 11 has been made considerably greater than the exterior diameter of the encompassed spigot end 12 in order to permit a certain amount of axial angularity between the two pipe sections, as might occur, for example, when an irrigation pipe line is laid over an irregular ground surface.

The bell and spigot ends of the telescoped or adjoining pipe sections, in the construction illustrated in Figures 1 and 2, are held together by a plurality (in this case 3) of locking pins 21 which extend through holes 19 in the spigot end 12, and which are adapted to have their outer ends engaged by outwardly-deformed pockets 20 in the bell end 11. A sealing member or gasket 13, made of suitable expansible and resilient material, such as rubber, is formed with an annular recess 18. The locking pins 21 have enlarged heads 22 of approximately the same width as the recess 18 of the gasket 13 and of approximately the same thickness as the depth of said recess, these heads 22 being also curved to correspond to the curvature of the recess 18. When the spigot and bell ends are to be secured together the spigot is inserted into the bell. The flared end 23 of the bell 11 presses the pins 21 inwardly against the tension of the gasket 13 until the ends of the pins snap into the pockets 20 of the bell 11. The pressure within the pipe line, after the pipe sections have been connected, acts through the gasket 13 to hold the locking pins 21 firmly in place. This means of locking the spigot and bell ends together is similar to that described in my U. S. Patent No. 2,270,089, previously referred to, and to which reference is made.

In the present case, however, it will be noted that the spigot does not extend into the bell as far as occurs in the construction described in my said Patent No. 2,270,089, and furthermore, that the sealing gasket 13 does not extend into the pipe section 10 beyond the bell. Furthermore, the end portion 14 of the gasket 13 (Figure 1) is formed with a greater diameter than that portion of the gasket lying within the spigot, so that such end portion 14 will form a seal with the adjacent inside surface of the bell 11 when the remainder of the gasket makes a seal with the spigot 12. As a result of having the larger diameter portion 14 of the gasket located in the recess formed by the corresponding portion of the bell, in the flow line, this end of the gasket 13 is located outside of the normal path of the liquid passing through the pipe line (the direction of flow being indicated by the arrow A). Consequently this end of the gasket, by offering practically no resistance to the passage of the liquid, results in a minimum tendency for the liquid to force its way between this forward end 14 of the gasket and the wall of the pipe. While resistance to the passage of the liquid is offered further along the gasket, namely by the section 17, where the internal diameter of the gasket decreases, by the time the liquid has reached this point in its travel it is too late for it to force its way between the gasket and pipe surface, and pressure on the section 17 of the gasket merely tightens and increases the seal formed by the enlarged end 14. Both end edges of the gasket are preferably beveled as at 15 and 16.

In the coupling illustrated in Figures 3 and 4 instead of the locking pins for securing the pipe ends together there is substituted an extending bracket or arm 29, formed integral with or otherwise firmly secured to the outside of the bell, extending beyond the bell end, which forms a locking means with a lug 32 on the outside of the spigot. The bracket or arm 29 has a pair of downwardly-extending ears 30, spaced apart a distance slightly greater than the thickness of the lug 32. Holes through these ears are arranged to register with a hole extending through the lug 32 and a suitable pin 33 passing through these registering holes secures the two pipe sections together. A pair of reinforcing ribs 31 strengthen the arm or bracket 29. While a plurality of such pairs of connected arms and lugs could be used for holding the two pipe sections locked together, I consider it sufficient and preferable to have just one, as shown in Figures 3 and 4. This makes a hinged joint between the pipe sections, and, in combination with my expansible sealing gasket, provides a more or less flexible coupling permitting the joined pipe sections to be arranged with some axial angularity with respect to each other when this is required by the surface of the ground or for any other reason.

In Figure 3 a modified form of my sealing gasket is shown. This modified gasket 24 has the enlarged diameter end 26, corresponding to the enlarged end 14 of the gasket 13 of Figure 1, which forms a seal similarly within the bell 27. But the outer periphery of this enlarged portion 26 of the gasket 24 is formed with a circumferential ridge or bead 28 which would normally extend beyond the outer periphery of this gasket portion. When the gasket is pressed within the bell and subjected to the internal pressure exerted by the fluid in the pipe line, the outer periphery of the gasket will be positioned as shown in Fig. 3 and the ridge or bead 28 will be pressed even more firmly against the surrounding wall of the bell than would be the case with the ordinary gasket surface. As a result this ridge or bead 28 produces an even tighter leak-proof seal. When the connected bell and spigot pipe ends are moved out of axial alinement the periphery of this ridge or bead 28 acts, to some extent, as a bearing for the gasket within the bell member. A gasket with its large diameter end formed in this manner could of course also be used with the coupling shown in Fig. 1.

Since the locking pins illustrated in Figures 1 and 2 are not used in the coupling of Figures 3 and 4, the gasket 24 (Figure 3) is not formed with an annular recess similar in shape to the recess 18 of Figure 1. However, in order to permit spigot and bell ends to move into slightly axial angularly with respect to each other without any disturbance of the sealing gasket 24, I consider it desirable to have a modified annular recess on the outside of the gasket, and for this purpose I provide a tapered recess designed to allow a wedge-shaped space 25 to exist between the end of the spigot and the adjacent portion of the gasket surface, so that some angular movement of the spigot will be possible without any movement of the gasket. A simple way of providing for this feature is to make the gasket wall of gradually-decreasing thickness beginning about one-half way along the portion of the spigot surrounding the gasket and extending to the end of the spigot, as illustrated in Figure 3. Both the gaskets 13 and 24 are formed with relatively broad shoulders, 34 and 35 respectively, adapted to bear against the end of the spigot member which prevent any axial sliding of the gasket in the direction of the flow of the fluid in the pipe line, even if the internal pressure is reduced and the pipe ends are moved out of axial alinement.

Other minor changes could be made in the gasket member within the scope of this invention, the most essential feature of the improved gasket being that it should have a larger diameter end located within the bell, in the manner described, so as to offer the least possible resistance to the flow of the liquid through the pipe at that end of the gasket. It is possible to use various other means, in combination with the gasket, for securing the bell and spigot pipe ends together. The two means which I have described are illustrative only. However it is very desirable that the pipe-fastening means should permit some flexibility at the joint and, for this reason, that the bell end should be of sufficiently larger diameter than the spigot end to allow for this flexibility and possible axial angularity between the connected sections.

I claim:

1. In a pipe coupling, a pair of pipe sections of the same internal diameter throughout their major portions, said pipe sections disposed in adjacent end to end and alined relation, a bell formed in the end of one pipe section, the other pipe section inserted part way in said bell and constituting a spigot member, the interior diameter of said bell being considerably greater than the exterior diameter of said spigot member, an internal tubular and expansible gasket extending from said bell into said spigot, said gasket having a smaller internal and external diameter portion adapted to be inserted in said spigot and a larger internal and external diameter portion adapted to fit in said bell beyond the end of said spigot, the internal diameter of said larger portion of said gasket being not less than the external diameter of said smaller portion, a shoulder on the outer surface of said gasket between said smaller and larger diameter portions, said shoulder engaging the end of said spigot to prevent said gasket from sliding too far into said spigot, and means for holding said pipe sections against separate longitudinal movement with respect to each other.

2. In a pipe coupling, a pair of pipe sections of the same internal diameter throughout their major portions, said pipe sections disposed in adjacent end to end and alined relation, a bell formed in the end of one pipe section, the other pipe section inserted part way in said bell and constituting a spigot member, the interior diameter of said bell being considerably greater than the exterior diameter of said spigot member, an internal tubular and expansible gasket extending from said bell into said spigot, said gasket having a smaller internal and external diameter portion adapted to be inserted in said spigot and a larger internal and external diameter portion adapted to fit in said bell beyond the end of said spigot, the internal diameter of said larger portion of said gasket being not less than the external diameter of said smaller portion, an annular recess on the outer surface of said smaller diameter portion adjacent said larger diameter portion adapted to lessen disturbance of said larger diameter portion in said bell end when said spigot and bell are moved out of axial alinement with each other, and means for holding said pipe sections against separate longitudinal movement with respect to each other.

WILLIAM H. STOUT.